(12) United States Patent
Nelson, Jr.

(10) Patent No.: US 6,191,730 B1
(45) Date of Patent: Feb. 20, 2001

(54) TWO-CHANNEL FAST-SEQUENCING HIGH-DYNAMICS GPS NAVIGATION RECEIVER

(75) Inventor: Robert Leonard Nelson, Jr., Austin, TX (US)

(73) Assignee: Trimble Navigation Limited, Sunnyvale, CA (US)

( * ) Notice: Under 35 U.S.C. 154(b), the term of this patent shall be extended for 0 days.

(21) Appl. No.: 09/315,115

(22) Filed: May 19, 1999

Related U.S. Application Data

(62) Division of application No. 08/990,495, filed on Dec. 15, 1997, now Pat. No. 5,949,374.

(51) Int. Cl.[7] .................. G01S 5/02; G01S 3/52
(52) U.S. Cl. .................. 342/357.05; 342/357.01; 342/357.06; 342/357.12; 701/200; 701/213; 701/214; 701/215
(58) Field of Search .................. 701/200, 213, 701/214, 216, 215; 342/357.01–357.17, 418; 455/12.1

(56) References Cited

U.S. PATENT DOCUMENTS

| | | | | |
|---|---|---|---|---|
| 4,970,523 | * | 11/1990 | Braisted et al. | 342/418 |
| 5,943,606 | * | 8/1999 | Kremm et al. | 455/12.1 |
| 6,067,503 | * | 5/2000 | Yakos | 701/213 |

* cited by examiner

*Primary Examiner*—Bernarr E. Gregory
(74) *Attorney, Agent, or Firm*—Thomas E. Schatzel; Law Offices of Thomas E. Schatzel, A Prof. Corp.

(57) ABSTRACT

A GPS navigation receiver channel tracks satellites' Doppler frequencies sequentially during the twenty milliseconds that the signal is coherent in each bit time of the navigation data modulation. It measures frequency by differencing the angles of signal-vector sums weighted by parabolic humps, exploiting the commutativity of linear processing operations to raise the signal-to-noise ratio before the nonlinear operation phase of detection.

3 Claims, 1 Drawing Sheet

TWO-CHANNEL FAST-SEQUENCING HIGH-DYNAMICS GPS NAVIGATION RECEIVER

Figure 1:
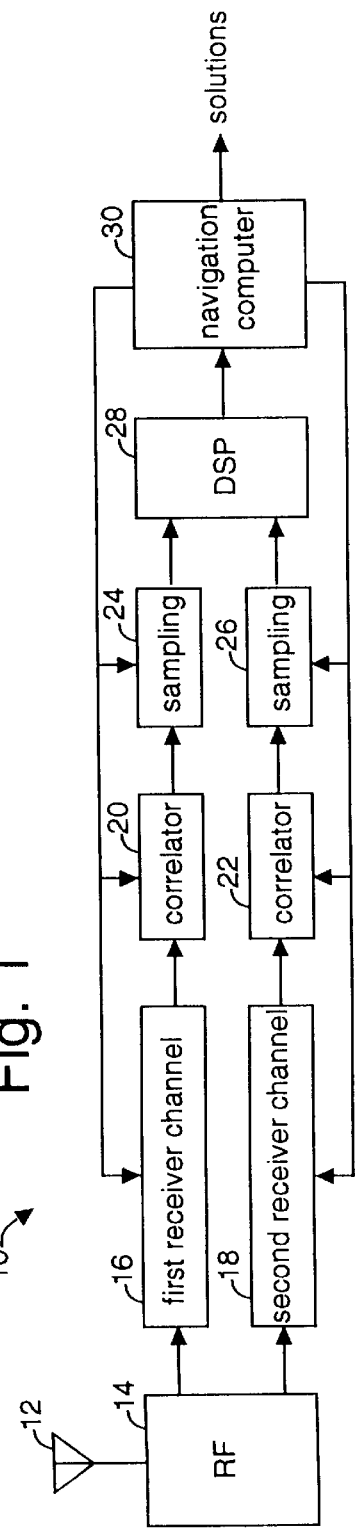

This application is a divisional of application Ser. No. 08/990,495 filed on Dec. 15, 1997, now U.S. Pat. No. 5,949,374.

BACKGROUND OF THE INVENTION

1. Field of the Invention

The invention relates generally to global positioning system devices and navigation receivers and more specifically to methods and apparatus for providing accurate position, velocity, and time solutions in high-acceleration, low-signal applications using only two receiver channels.

2. Description of the Prior Art

A unique direct-sequence spectrum-spreading code modulates each global positioning system (GPS) satellite signal by alternating the signal's phase by one hundred eighty degrees. The receiver commonly despreads the signal by multiplying it by a replica of the transmitted code. The despread signal is the sum of a component in phase with a real or hypothetical local-oscillator signal and of a second component ninety degrees out of phase with that local oscillator, which components together constitutes a two-dimensional signal vector whose angle corresponds to the despread signal's phase.

A data message carrying data that describe the satellites' positions and carry other information about the GPS system also modulates the signal by modulo-two addition with the spreading code at a fifty-hertz rate. Since the data message's content is not generally known in advance at the receiver, the receiver design commonly assumes the transmitted signal to be coherent for only the twenty milliseconds of each bit time.

In effect, the satellite's and the receiving antenna's relative motion further modulates the phase of the GPS signal, but in a continuous way rather than in steps of one hundred eighty degrees. The antenna's relative velocity therefore has the effect of a frequency modulation, or Doppler shift. The receiver commonly makes measurements of this motion-caused phase modulation, either as it affects the phase of the spreading-code modulation or the phase of the despread carrier or both.

The receiver commonly tracks the phase of the spreading code by inducing small code misalignments and measuring their effect in order to maximize the amplitude of the despread signal. The receiver also commonly measures or tracks the phase of the despread signal, whether or not those phase measurements also contribute directly to the navigation solution, in order to compute the Doppler shift, by manipulating the frequency or phase or both of the local-oscillator signal. The Doppler shift, which is the rate of change of the signal phase, must be known to tune the receiver, since the possible Doppler shift of many kilohertz is much greater than the narrow bandwidth needed to receive each despread GPS signal.

The receiver commonly averages over time to reduce the noise of phase measurements, either before or after the nonlinear phase-detection operation of measuring the signal vector's phase angle. Because of this operation's nonlinearity, the signal must dominate the noise at the phase detector if the receiver is to recover useful phase information from the signal. This effect, in which signal-to-noise ratios below a certain detection threshold at the antenna cause substantial loss of information, is common to angle-modulation systems, including common frequency-modulation broadcasting.

Detecting phase first in a wide bandwidth to create a phase function $\phi(t)$, then averaging over a time T which coincides with or is within the twenty-millisecond data-bit time during which the signal is coherent $$\phi_u = \frac{1}{T}\int_{-T/2}^{T/2} \phi(t)\,dt$$

has the advantage of eliminating the need to synchronize any pre-detection averaging or band-limiting with the bit edges, since the duration of the contamination of the phase function by the incoherence at each data-bit edge is a negligible fraction of the bit time. This technique is therefore often used when a high signal-to-noise ratio can be relied upon.

Averaging the signal vector first for as long a time as it is coherent, that is, for the twenty-millisecond bit time, $$s_u = \frac{1}{0.02}\int_{-.01}^{.01} s(t)\,dt$$

has the advantage of significantly lowering the detection threshold, for example, by a substantial thirteen decibels when the predetection averaging is lengthened from one millisecond to the full twenty milliseconds. This allows use of much noisier signals. Although the scaling shown is correct for the vector average, the scaling of this or any predetection averaging is actually irrelevant since phase detection discards amplitude information.

Except in special cases in which time, altitude, or other position information is known, a GPS navigation receiver must track at least four satellites to find its antenna's position in three dimensions. A receiver that has enough channels can dedicate a channel to tracking each satellite. When there are more satellites to track than channels to track them, receivers ordinarily resort to time-sharing strategies. Deliberately providing only a few channels to be shared among the satellites tracked reduces size, hardware complexity, and cost, at the expense of loss of signal power or risk of loss of carrier-phase lock.

A "multiplexing" receiver, as referred to herein, completes at least one cycle of channel-sharing during each twenty-millisecond bit time. It operates otherwise much like a multi-channel receiver, receiving phase and data almost continuously from all satellites tracked. However, a four-satellite multiplexing receiver averages the signal for no more than one-fourth of the bit time, and therefore pays a six-decibel detection-threshold penalty.

A "sequencing" receiver, as referred to herein, dwells on each satellite for one or more bit times. Sequencing receivers usually include two channels, one to sequence among the satellites for navigation and one to dwell on one satellite for a longer time to accumulate data, since the sequencing channel misses most of the data bits from any one satellite.

A sequencing receiver that dwells on each satellite for the one bit time needed for optimum linear processing is a "fast-sequencing" type, as used herein. Assuming that it can visit four satellites within one hundred milliseconds, the largest step that a nineteen meter-per-second-per-second acceleration can produce in that 100-millisecond cycle time is ninety-five millimeters or one-half wavelength at the L1 carrier frequency of 1.5754 gigahertz. Thus acceleration of 1.94 times that of earth's gravity, or 1.94 G, is needed before the phase uncertainty exceeds the maximum that can be identified unambiguously.

This does not mean however that it is possible to track carrier phase under two-G acceleration with a single GPS receiver channel. Even though the carrier phase can be determined in a single 100-millisecond interval, the Doppler shift due to velocity is still unknown. So, without a way to remove the effect of the present velocity from the next measurement, the phase-shift due to further acceleration will add to that due to present velocity. The quickest way to measure velocity from phase measurements every one hundred milliseconds is by differencing successive phase measurements to get the average velocity between them. The greatest velocity change that a 0.97 G or 9.5 meter-per-second-per-second acceleration can produce in the one hundred milliseconds between the centers between velocity measurements is 950 millimeters per second, which velocity corresponds to a phase change of ninety-five millimeters in the one hundred milliseconds between phase measurements or one-half wavelength at the L1 frequency. The practical result is to preclude tracking carrier phase per se across the gaps in each satellite's reception except for the most sedate applications with accelerations under one G.

Consequently, sequencing receivers have commonly been designed to reacquire each satellite for each new cycle of the sequence. Such a receiver ordinarily needs about five seconds to sequence a channel around to all the satellites being tracked. Thus it is a "slow-sequencing" type as used herein. The signal strength needed to acquire or reacquire a satellite is much greater than that needed to maintain continuous tracking. Thus the signals must be strong; so conventional slow-sequencing receivers, like multiplexing receivers, are particularly hampered by low signal levels. In summary, slow-sequencing receivers sequence slowly because they must reacquire the satellites; and they must reacquire the satellites because so much time elapses between successive measurements due to their slow sequencing.

SUMMARY OF THE PRESENT INVENTION

It is therefore an object of the present invention to provide a GPS navigation receiver that uses fewer receiver channels.

It is another object of the present invention to provide a GPS navigation receiver that is useful in high acceleration environments.

It is another object of the present invention to provide a GPS navigation receiver that is useful in low signal-to-noise environments.

Briefly, a GPS navigation receiver embodiment of the present invention comprises one receiver channel for position fixing and another receiver channel for acquisition and for reading the satellite data. The former tracks each satellite for the entire duration of the twenty milliseconds that the signal is coherent in one bit time of the navigation data modulation, but it tracks in terms of frequency rather than phase.

An advantage of the present invention is that a navigation satellite receiver is provided that can sequence through all the necessary four satellites in five bit times or 100 milliseconds without necessitating any satellite reacquisitions and thereby operate reliably in otherwise unfavorable signal environments.

Another advantage of the present invention is that a high-dynamics navigation satellite receiver is provided that needs only two channels, one for tracking and the other for acquisition, for accelerations up to about ten times that of gravity.

These and other objects and advantages of the present invention will no doubt become obvious to those of ordinary skill in the art after having read the following detailed description of the preferred embodiment that is illustrated in the drawing figures.

IN THE DRAWINGS

Figure 2:
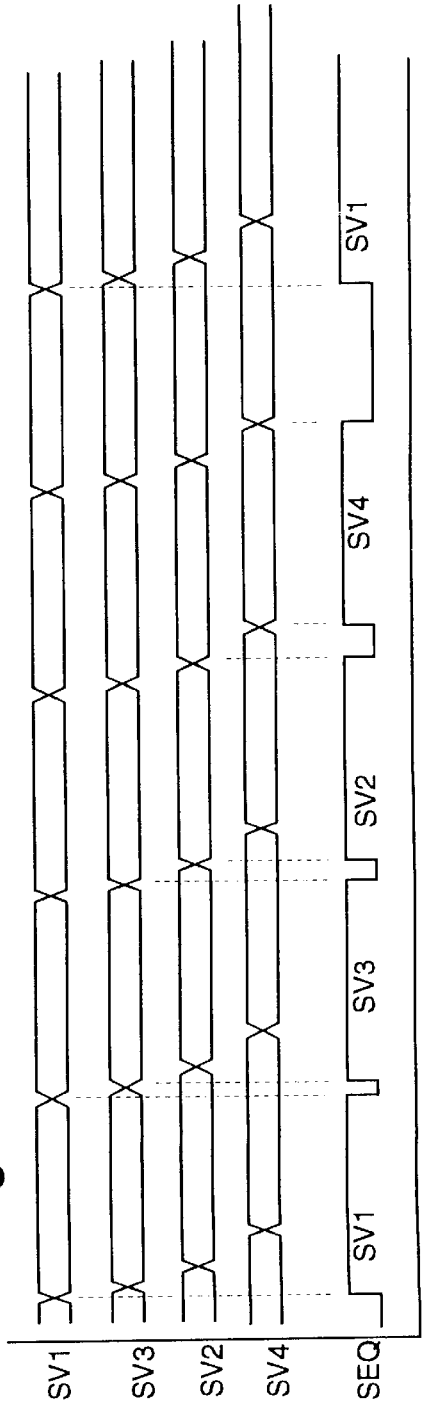

FIG. 1 is block diagram of a fast-sequencing navigation satellite receiver embodiment of the present invention; and FIG. 2 is a graph that represents the sequencing method used by the receiver of FIG. 1.

DETAILED DESCRIPTION OF THE PREFERRED EMBODIMENT

FIG. 1 illustrates a fast-sequencing navigation satellite receiver embodiment of the present invention, referred to herein by the general reference numeral 10. The receiver 10 comprises an antenna 12 for receiving L-band radio transmissions from orbiting navigation satellites. Assuming that there is no independent position or time information available to the receiver 10, a minimum of four such satellites must be visible to the antenna 12 in order to provide time and three dimensional position and velocity solutions. A radio frequency (RF) amplifier 14 boosts the radio signals for down-conversion and demodulation. A first receiver channel 16 sequences among the visible satellites to collect twenty consecutive milliseconds worth of measurements from each before moving to sample the next. A second receiver channel 18 provides for the reception of the navigation data modulation and for searching for new satellites to track.

A pair of correlators 20 and 22 despreads the signal, allowing narrow-band filtering to provide a processing gain that lifts the received signal out of the noise. A pair of samplers 24 and 26 digitize the signals for processing by a digital signal processor (DSP) 28. The first receiver channel 16, while tracking the satellites' despread carriers sequentially, also tracks the spreading code phase in a conventional manner. The second receiver channel 18 tracks one satellite continuously in any conventional manner. A navigation computer 30 computes the receiver's position, velocity, and time from the apparent distances, or pseudo-ranges, between the satellites and the receiver, based on the known times of code transmission and the presumed time at the receiver, measured through the first receiver channel 16 and from the satellite ephemeris information decoded through the second receiver channel 18 by the DSP 28.

The first receiver channel 16 sequences among several satellites and dwells long enough on each to track the Doppler shift by measuring the amount by which it has changed from the value known from the previous measurement. Such measurement allows tracking lock to be maintained across four or more navigation satellites.

FIG. 2 represents the method used by the first receiver channel 16 to sequence among the navigation satellites, for example, four space vehicles (SV1–SV4). Each navigation satellite transmits fifty-baud navigation data whose bit edges, depending on the distance between satellite and receiver, differ among the several satellites' transmissions, represented here in FIG. 2 as double-valued squarewave waveforms with possible transitions every twenty milliseconds. The first receiver channel 16 is provided with the appropriate Doppler correction and the correlator 20 is provided with the appropriate code and code phase to sequentially track SV1, SV3, SV2 and then SV4, for example, as represented in FIG. 2 by a trace SEQ. The first navigation satellite SV1 is tracked continuously from the beginning of the data bit for twenty milliseconds to the end of the bit time. The navigation computer 30 then provides the first receiver channel 16 with the appropriate Doppler correction and the correlator 20 with the appropriate code and code phase to track navigation satellite SV3, which is the satellite whose next data transition occurs soonest. A small idle period exists until the start of the beginning of the data bit from navigation satellite SV3. Then measurements are taken for the twenty milliseconds to the end of the bit time. This continues for each satellite being tracked.

Because the sequenced receiver channel 18 switches to track the signal during a whole bit time from the next satellite which has the earliest bit transition, the aggregate time wasted waiting for each complete twenty-millisecond navigation-channel data-bit time to begin on the next satellite can never exceed twenty milliseconds. Thus four satellites can all be visited within 100 milliseconds.

In the present invention, the sequencing receiver channel 18 measures the Doppler shift directly during each twenty-millisecond period that the signal from each satellite is coherent. The effect of present velocity is thus fully compensated for. Only future acceleration remains a problem. At a minimum, each velocity measurement must provide enough information to make the next velocity measurement 100 milliseconds later. Thus even if the acceleration were as much as ten G's, the velocity uncertainty after 100 milliseconds would be 9.8 meters per second, or 51.5 hertz Doppler shift at the L1 carrier frequency. This is not an unreasonable frequency shift to measure in twenty milliseconds by the method of the present invention.

The method of the present invention for measuring the Doppler shift is equivalent to measuring the rate of change of a scalar phase by fitting a straight line to the data using a least-squares criterion. This in turn is equivalent to averaging the phase measurement as a function of time across the twenty-millisecond bit time with a ramp-like weighting:

$$\omega_r = \frac{12}{T^3} \int_{-T/2}^{T/2} t\phi(t)\,dt = 1500000 \int_{-.01}^{.01} t\phi(t)\,dt$$

Unfortunately, directly detecting the phase as a function of time in order to apply such a weighting is just as impractical for averaging phase rate as for averaging phase, because of the noise that results when phase is measured in a wide bandwidth to produce $\phi(t)$.

Similarly applying the ramp weighting for Doppler-shift frequency measurements to the signal-vector samples, on the other hand, yields the vector velocity of the signal, not the scalar frequency-shift measurement desired.

In the present invention, low-noise measurements of phase rate or frequency shift is preferably based on the commutative property of linear processing. Linear operations to the signals can be applied in any order. The nonlinearity of phase detection, which must occur at some point in the processing, is tolerated by invoking the approximation that it behaves like a linear process when the variations in phase are small. This condition is satisfied when the phase change and the noise amplitude during the measurement are both small compared to one radian. The detection threshold may then be thought of as the signal-to-noise ratio for which this approximation is no longer valid.

The basic linear processing of the present invention comprises correlation of the ramp weighting function with the signal samples. The complementary linear operations of integration and differentiation are inserted into such processing without changing the overall result. The integration operation is applied to a ramp-like frequency-measurement weighting function to create a parabolic "hump" weighting:

$$s_h = \int_{-T/2}^{T/2} \left[ \int_{-T/2}^{t} \frac{12t}{T^3} dt \right] s(t)\,dt =$$

$$\frac{1.5}{T} \int_{-T/2}^{T/2} \left[ \frac{4t^2}{T^2} - 1 \right] s(t)\,dt = 75 \int_{-.01}^{.01} (10000t^2 - 1) s(t)\,dt$$

The differentiation is applied to the resulting average. The net effect is no change to the result, under the assumption of linearity.

After averaging of the signal vector with the hump weighting, the noise will be substantially reduced. Hump weighting can be seen to be only about 0.8 decibels noisier than uniform weighting by averaging the square of the ratio of the weighting functions over the measurement time:

$$\frac{1}{T} \int_{-T/2}^{T/2} \left(\frac{1.5}{T}\right)^2 \left(\frac{4t^2}{T^2}\right)^2 T^2\,dt = 1.2$$

This point in the processing is an opportune time to do the detection since the high signal-to-noise ratio validates the assumption of linearity. The resulting phase measurements from two successive hump-weighted averages are differenced to obtain the phase rate. Such hybrid vector-scalar processing approaches the optimum processing of low-noise short-term phase measurements, and continues to do well even in high-noise, high-rate situations.

The absolute limit for this kind of velocity measurement occurs when the hump integral goes to zero. The amplitude of the hump integral, as a function of Doppler shift $\omega$, is, $$s_h = 75 \int_{-.01}^{.01} (10000t^2 - 1)\cos(\omega t)\,dt =$$

$$-3000000\omega^{-3}\sin(.01\omega) + 30000\omega^{-2}\cos(.01\omega)$$

The frequency of the first null in this function is found by setting it to zero and solving for $\omega$:

tan $(0.01\omega)=0.01\omega$ $\omega=449.3=2\pi 71.5$ (Hz).

The three-decibel point is at 28.89 hertz.

The detection threshold is defined as equal signal and noise power at the detection bandwidth. The following scaling of the integral of the square of the hump weighting function results in a phase noise of about $\sqrt{0.5}$ radian, which corresponds to equal signal and noise power:

$$\sigma_\phi^2 = 46.875 \int_{-.01}^{.01} (1 - 10000t^2)^2\,dt = .5$$

The same scaling, but with the integrand modified by the square of the ratio of the weighting functions for the ramp and the hump, gives the velocity noise:

$$\sigma_\omega^2 = 46.875 \int_{-.01}^{.01} \frac{1500000^2}{75^2} t^2\,dt$$

$$\sigma_\omega = 111.8 = 2\pi \cdot 17.8 \text{Hz}$$

This is less than one quarter the 71.5 hertz range of the velocity measurement technique. If the signal remains at the detection threshold, the velocity noise can be expected to exceed four standard deviations and cause a loss of frequency lock about once every half hour, at ten measurements per second.

To implement the Doppler-frequency measurement, navigation computer 30 computes hump-weighted sums of n−1 consecutive signal samples. It measures the phase angles of two such successive vector sums spanning the n samples of one twenty-millisecond data-bit time. The phase rate or frequency shift is then the difference between the angles, divided by the sampling interval:

$$\omega = \frac{\text{angle}(\text{hump}_i) - \text{angle}(\text{hump}_{i-1})}{\Delta t}$$

Navigation computer 30 may compute these hump-weighted sums explicitly or, to reduce the computational workload, by adding to the previous hump sum the ramp-weighted sum of the n most-recent signal samples, which converts the previous hump to the present hump:

$$\text{hump}_i = \text{hump}_{i-1} + \text{ramp}_i$$

To prevent accumulation of computational errors, these and the calculations that follow must be done in exact integer arithmetic. This ramp-weighted sum may be computed explicitly at each iteration or in various ways that further reduce the computational workload. One method is, like the hump computation, to compute each ramp by adding to the previous ramp a quantity to convert it to the present ramp:

$$\text{ramp}_i = \text{ramp}_{i-1} - k\ \text{sum}_i + (k/2)(n+1)(\text{signal}_i + \text{signal}_{i-n})$$

where k must be even for even n but may have any integer value for odd n. The overall scaling of the weighting process is immaterial, since the phase-angle change does not depend on it. The variable sum is maintained in a similar manner as the uniformly weighted sum of the n+1 most-recent samples:

$$\text{sum}_i = \text{sum}_{i-1} + \text{signal}_i - \text{signal}_{i-n-1}$$

Another efficient way of computing the ramp-weighted sum is as a combination of an asymmetrical ramp and a uniform sum:

$$\text{ramp}_i = k_i\ \text{aramp} - (k/2)(n-1)\text{sum}_i$$

$$\text{aramp}_i = \text{aramp}_{i-1} - \text{sum}_i + n\ \text{signal}_i$$

$$\text{sum}_i = \text{sum}_{i-1} + \text{signal}_i - \text{signal}_{i-n}$$

Subscripts are shown on all vector variables for clarity to relate them to the iteration scheme; but, since most are simply incremented at each iteration, an array of vectors is needed only for the signal samples.

Although the present invention uses a frequency measurement to track the signal, it is not restricted from also making phase measurements. Up to almost two G, it can measure the phase shift unambiguously under the assumption of no acceleration since the last measurement, as already described. However, by using the present frequency measurement in combination with the previous one or ones it can estimate acceleration since the last measurement and therefore track phase without ambiguity up to much higher accelerations.

The frequency measurement method of the present invention can also be used to advantage to improve the dynamic tracking of non-sequencing receivers by providing a direct short-term measurement of Doppler shift.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A navigation satellite receiver comprising:

a first receiver channel or set of channels connected to a radio antenna for demodulating a navigation-data modulation on any of a plurality of radio transmissions from a corresponding plurality of navigation transmitters and for acquiring signals from additional transmitters;

a second receiver channel or set of channels connected to a radio antenna for sequentially tracking a plurality of radio transmissions from a corresponding plurality of transmitters;

means for sequencing the second receiver channel or channels for collecting a period of measurements sequentially from each of said plurality of transmitters that coincides with the bit times of said navigation data in which said transmissions are coherent; and a computing means for measuring the Doppler shift or frequency error.

2. The receiver of claim 1, further comprising:

computing means for tracking the phase of the signal vector measurements, wherein the phase ambiguity caused by large accelerations is resolved by using the successive Doppler-shift measurements to estimate and remove the effect of the acceleration.

3. The receiver of claim 1, wherein:

the sequencing means switches after each data-bit time to the transmission whose next data transition occurs soonest, so that the aggregate time wasted waiting for each complete data-bit time to begin on the next transmission can never exceed the duration of one data bit over the complete sequencing cycle.

* * * * *